United States Patent [19]
Gould et al.

[11] Patent Number: 5,453,685
[45] Date of Patent: Sep. 26, 1995

[54] INDUCTIVE POSITION SENSING DEVICE AND APPARATUS WITH SELECTABLE WINDING CONFIGURATION

[75] Inventors: Larrie A. Gould, Fort Wayne, Ind.; Ernest F. Close, Apache Junction, Ariz.

[73] Assignee: Philips Electronics North America Corporation, New York, N.Y.

[21] Appl. No.: 101,170

[22] Filed: Jul. 30, 1993

[51] Int. Cl.⁶ ............... G01B 7/14; G08C 19/06; H01F 21/02; G01D 5/20
[52] U.S. Cl. ............... 324/207.16; 324/207.24; 324/207.22; 336/45; 336/136; 340/870.31
[58] Field of Search ............... 324/207.15–207.19, 324/207.24, 262, 207.22; 336/45, 130, 136, 131, 224; 340/870.31–870.36

[56] References Cited

U.S. PATENT DOCUMENTS

| | | | |
|---|---|---|---|
| 2,245,373 | 6/1941 | Weis et al. | 336/130 |
| 2,294,881 | 9/1942 | Alford | 340/870.31 X |
| 2,452,156 | 10/1948 | Schover | 324/207.17 |
| 3,138,772 | 6/1964 | Persons, Jr. | 336/130 X |
| 4,170,754 | 10/1979 | Schmitz et al. | 324/207.17 |
| 4,350,954 | 9/1982 | Seilly | 336/130 |
| 4,667,158 | 5/1987 | Redlich | 340/870.36 |
| 4,833,919 | 5/1989 | Saito et al. | 324/207.16 |
| 4,926,123 | 5/1990 | Redlich | 324/207.17 |
| 5,036,275 | 7/1991 | Munch et al. | 324/207.17 |
| 5,045,785 | 9/1991 | Hansen | 324/207.16 |
| 5,068,607 | 11/1991 | Redlich et al. | 324/207.16 |

FOREIGN PATENT DOCUMENTS

| | | | |
|---|---|---|---|
| 0378402 | 7/1990 | European Pat. Off. | |
| 1559091 | 1/1980 | United Kingdom | 324/207.16 |
| 8607144 | 12/1986 | WIPO | |

*Primary Examiner*—Sandra L. O'Shea
*Assistant Examiner*—Jay M. Patidar
*Attorney, Agent, or Firm*—Robert J. Kraus

[57] ABSTRACT

A variable inductance device for indicating the position of one body relative to another includes primary and secondary windings which are mounted such that one is slidable over the other. The primary winding is wound on a body including annular channels for retaining the winding turns in an arbitrarily selectable turns distribution. The secondary is a shorted winding. A signal producing circuits electrically connected to the primary winding for producing a signal which varies with the device inductance. By selecting the turns distribution such that the device's inductance variation with position and the signal producing circuit's output variation with inductance complement each other, the output signal is made to vary as an arbitrarily selectable function of the position.

30 Claims, 6 Drawing Sheets

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | BAY NUMBER |
|---|---|---|---|---|---|---|---|---|---|---|---|---|---|---|---|---|---|---|---|---|---|---|---|
| 180 | 130 | 137 | 146 | 141 | 141 | 138 | 135 | 134 | 136 | 136 | 130 | 130 | 128 | 128 | 128 | 128 | 128 | 125 | 125 | 125 | 125 | 262 | NO. OF TURNS |

INDUCTIVE POSITION SENSING DEVICE AND APPARATUS WITH SELECTABLE WINDING CONFIGURATION

BACKGROUND OF THE INVENTION

1. Field of the Invention

The invention relates to apparatus for indicating the position of one body relative to another and to a variable inductance device for use in such apparatus.

2. Description of Related Art

A variety of inductive position sensing apparatus are known for sensing and indicating position. Typically these apparatus include a position sensing device including a coil with a particular winding configuration and a relatively movable member which is electromagnetically coupled to the coil. The inductance of the device varies with the relative position of the movable member and thus is an indication of the position.

The particular winding configuration chosen for a specific position sensing device of this type is an important factor in obtaining a desired inductance versus position relationship. Unfortunately, it is difficult to repeatably produce specific winding configurations in production quantities, and these are sometimes the most effective configurations for obtaining a particular desired relationship. Further, the dynamic environments in which the devices are frequently used may subject the windings to vibrational and shock forces which alter their configurations. Additionally, in uses which subject the devices to extreme temperature variations, such as in automotive applications, the winding configurations may be altered by thermal expansion and contraction. In either case, the alteration may be either temporary or permanent.

SUMMARY OF THE INVENTION

It is an object of the invention to provide an inductive position sensing device which is readily adaptable to a wide range of winding configurations.

It is another object of the invention to provide such an inductive position sensing device in which a selected winding configuration is resistant to alteration by vibration, shock and thermal forces.

It is yet another object of the invention to provide an apparatus including such a device for producing a signal which varies with position in accordance with an arbitrarily selectable function.

In accordance with the invention, a device for sensing the position of a first member relative to a second member includes a first rod-shaped body, comprising an electrically insulating material, having a predetermined length disposed around an axis and along which structural retention means extends for retaining turns of a winding in an arbitrarily selectable, axial distribution. In order to obtain a desired variation of inductance with position, a primary winding comprising an electrical conductor is wound along at least part of the predetermined length in engagement with the structural retention means in a selected axial turns distribution. A second rod-shaped body, comprising an electrically conductive material, forms a shorted secondary winding. At least one of the rod-shaped bodies is hollow and is axially slidable over the other. First and second mounting means are provided for attaching the first and second rod-shaped bodies to the first and second members, respectively, for moving with the members.

In a preferred embodiment of the invention, the structural retention means comprises an integrally formed portion of the first rod-shaped body and defines a plurality of axially adjacent, circumferentially extending compartments into which turns of the primary winding are wound, with selected numbers of turns being retained in respective ones of the compartments. The number of winding turns per unit of axial length (i.e. the pitch of the winding) can be arbitrarily varied along the length of the retention means by simply selecting the appropriate number of turns to be wound in each compartment. The different compartments of the retention means may have equal or unequal axial lengths.

The turns distribution of the primary winding is selected to effect the desired inductance versus position relationship, taking into account any distorting influences on the electromagnetic field produced by the primary winding during operation. A particularly advantageous turns distribution is one which has a concentration of turns proximate first and second ends of the winding and which has a pitch that varies along an intermediate portion of the winding in approximation of a predefined inductance—position relationship. The concentrations of turns proximate the first and second ends compensate for a decrease in the intensity of the field which would otherwise occur because of bending of the field as it leaves the ends of the winding. The predefined inductance—position relationship approximated by the intermediate turns distribution is determined to make this relationship compatible with circuitry that is to be connected to the sensing device.

An apparatus for producing a predefined functional relationship between an output signal and the relative position of the first and second rod-shaped bodies can be implemented by tailoring the inductance-position characteristic of the position sensing device to complement the inductance-output signal characteristic of a signal producing means to which it is connected. Thus, an apparatus for producing a signal S which varies with a sensed position d, in accordance with an arbitrarily selectable function, can be made. This is done by electrically connecting the primary winding of the position sensing device to an input of a signal producing means which produces an output signal that varies with the inductance L of the device in accordance with a predefined function f(L). The turns distribution of the primary winding is selected to produce an inductance variation L(d) of the device which complements the operation of the signal producing means such that it produces an output signal that varies in accordance with a desired relationship between position and output signal. The relationship can be any monotonic function of the position d, for example, linear, exponential, square law functions, and monotonic portions of oscillatory functions, such as sinusoidal functions.

In a particularly advantageous embodiment of such an apparatus, the inductance of the position sensing device is incorporated in an LC oscillator as the inductance L and the oscillator produces an output frequency which varies linearly as a function of the relative position of the first and second members. Because the frequency of a conventional LC oscillator does not vary linearly with inductance, but is inversely proportional to $(LC)^{1/2}$, the turns pitch of the intermediate portion is varied incrementally to effectively produce a series of discrete inductances which will cause a plot of the frequency outputs for corresponding positions d to fall on a straight line.

DESCRIPTION OF THE PREFERRED EMBODIMENT

Figure 1:
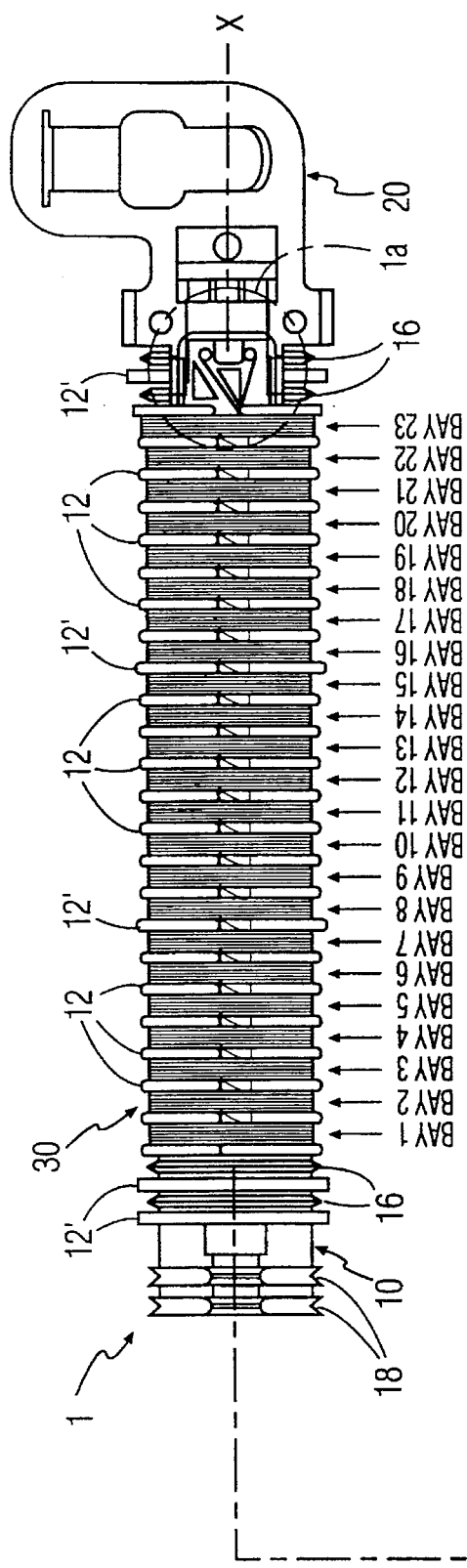
FIG. 1 is a front view, partly in section, of an embodiment of a position sensing device in accordance with the invention.
Figure 1:
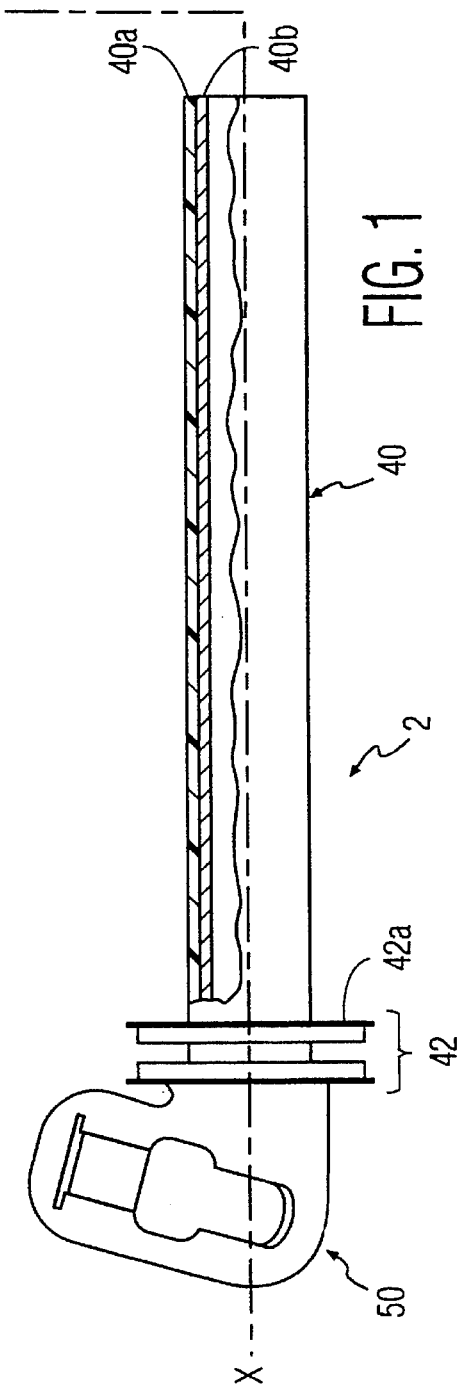

FIG. 1 illustrates an exemplary position sensing device in accordance with the invention. The device includes first and second parts (1 and 2, respectively) which are assembled along an axis x-x such that the second part is axially slidable within the first part. This particular embodiment is ideally suited for use with automotive suspension systems.

The first part 1 comprises a rod-shaped, hollow body 10, which is generally cylindrical in shape, a plurality of attached partitions 12, 12', and an attached mounting means 20. Preferably, the body 10, the partitions 12, 12' and the mounting means 20 are integrally molded from an electrically-insulating, thermoplastic material such as polyester or nylon.

Figure 1A:
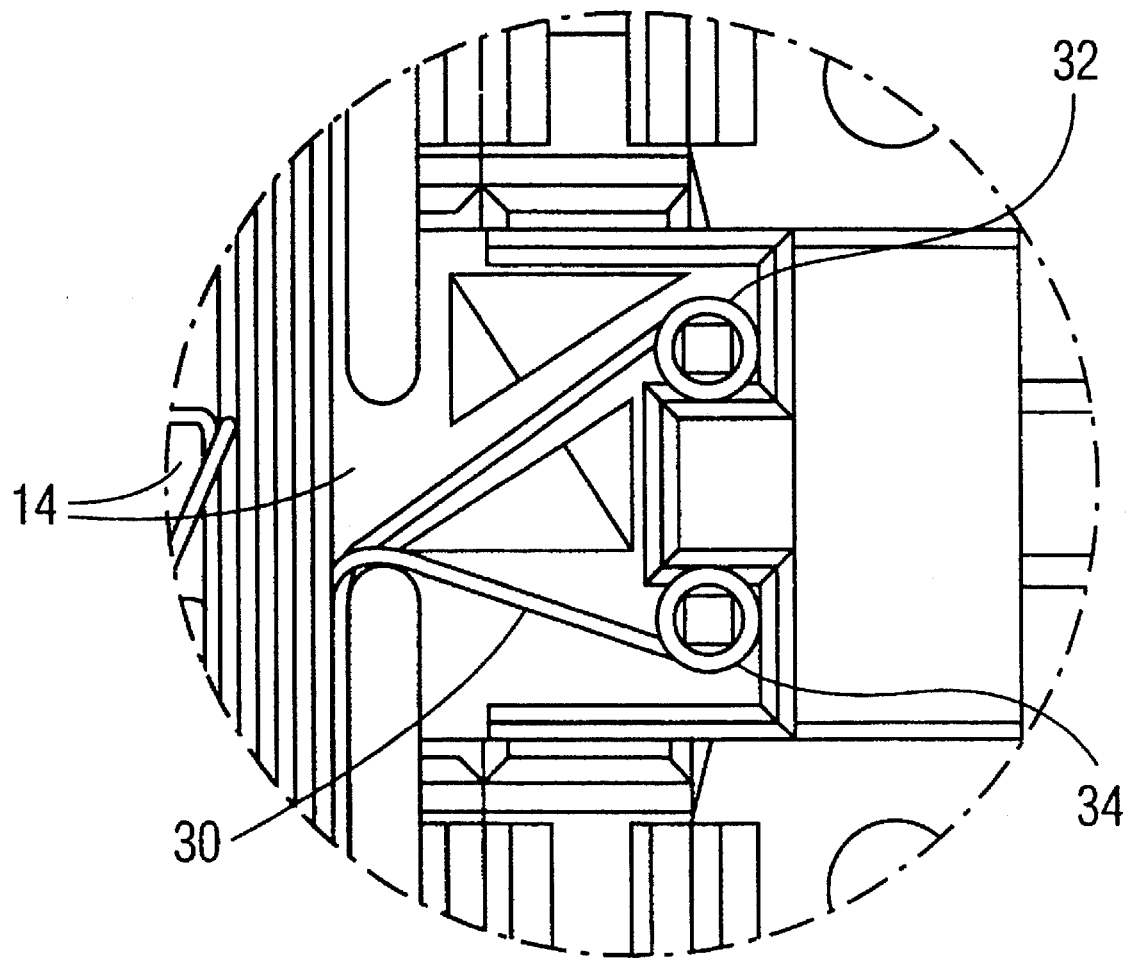
FIG. 1a is magnified view of a portion of the position sensing device of FIG. 1.

The partitions 12, 12' extend radially outwardly from and substantially circumscribe an outer surface of the body 10. They are arranged to define a plurality of axially adjacent annular channels. Most of these channels serve as compartments or bays for retaining turns of a wire 30 forming a primary winding. Gaps are provided in the partitions to facilitate the passage of the winding wire into and/or out of adjacent ones of the channels. Two of these gaps 14 are more clearly visible in FIG. 1a, which is an enlarged view of the circled portion of the first part 1. Also more clearly visible in FIG. 1a are two rectangular-cross-section electrical terminals 32 and 34 around which first and second ends of the winding wire 30 are wrapped.

The wire itself is preferably magnet wire of a small diameter (e.g. 38 AWG) and the terminals are preferably tinned, metallic posts which are staked into the body 10. The wire originates at terminal 32, passes axially through all of the gaps 14 to bay 1, and then is successively wound a specified number of turns in each of the bays (again passing through the gaps) until it ends at terminal 34. The bays are separately numbered in FIG. 1 and the number of winding turns retained in each of these bays is also specified in this figure.

The second part 2 comprises a rod-shaped, hollow body 40, a stop 42, and an attached mounting means 50. The body 40 includes an outer cylinder 40a molded over an inner cylinder 40b. The inner cylinder 40b is made of an electrically conductive, nonmagnetic material, such as aluminum or copper and forms a shorted, single-turn, secondary winding which is electrically isolated from the primary winding. The outer cylinder 40a is made of a wear-resistant material. Preferably, the outer cylinder 40a, the stop 42, and the mounting means 50 are integrally molded from a thermoplastic material such as polyester or nylon. Alternatively, the outer and inner cylinders 40a and 40b may be replaced by a single cylinder of electrically conductive material having one end retained in the stop 42.

Figure 2:
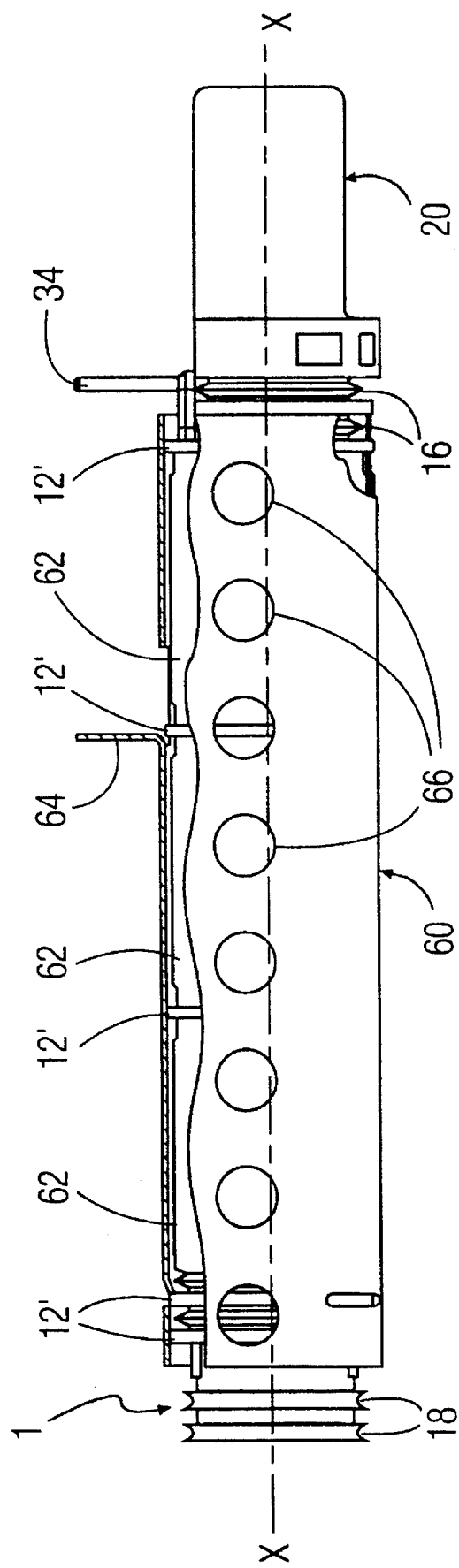
FIG. 2 is a bottom view, partly in section, of a part of the position sensing device of FIG. 1 onto which an electromagnetic shield has been incorporated.

In many operating environments, it is desirable to shield the primary winding and regions of the position sensing device where the primary and secondary windings are electromagnetically coupled. This shielding performs two functions. It protects the device from field-disturbing outside influences and contains electromagnetic emissions from the device. FIG. 2 illustrates the attachment of such a shield 60 to the first part 1 of the sensing device. This shield comprises a cylindrical body of an electrically conductive, magnetically permeable composition. In a particularly effective embodiment, the cylinder is formed from cold-rolled steel and is completely coated with copper. Optionally, the copper coating may itself be overcoated with a corrosion resistant material such as tin. Further, the shield could have an axially extending slit to prevent the circumferential flow of electromagnetically induced current.

The shield 60, which is shown partly in cross section in FIG. 2, has an inside diameter which is substantially equal to an outside diameter of the partitions 12', and is supported on these partitions. The outside diameters of the partitions 12 and of the primary winding turns (both visible in FIG. 1) are sufficiently smaller than those of the partitions 12' to provide clearance from the shield 60. Preferably the partitions 12 and the portions of the primary winding disposed between the partitions 12' are covered with an electrically insulating tape 62 of a material such as woven fiberglass, mylar or TEFLON plastic tape.

The shield also includes a radially-extending terminal 64, to facilitate electrical grounding, and a plurality of openings 66. The openings are optional and are provided to facilitate the passage of a plastic material to the primary winding if it is desirable to overmold the winding and shield for protection in harsh environments, such as are encountered in automotive applications. Additionally, the body 10 on which the primary winding is supported includes a plurality of circumferential ridges 16 and valleys 18 for securing any such overmold against axial movement.

Figure 3:
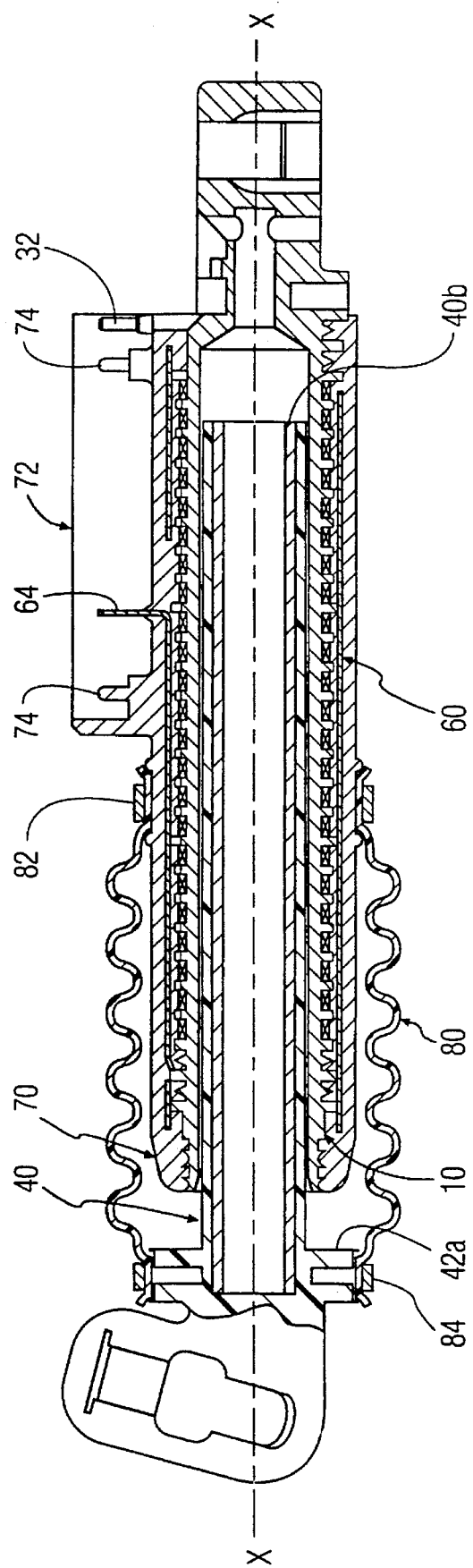
FIG. 3 is a bottom view of the part illustrated in FIG. 2 which has been partially molded over.

FIG. 3 illustrates an assembled position sensing device which includes all of the above-mentioned protective features and which further includes means for preventing grime from becoming lodged between the bodies 10 and 40. Specifically, the assembled device includes the electromagnetic shield 60, a plastic casing 70 of a thermoplastic material such as polyester or nylon which has been molded over the body 10 and around the shield 60, and an expandable rubber boot 80.

The plastic casing 70 includes an integral portion which forms both the walls of a circuit housing 72 and a plurality of pins 74 for supporting a circuit board (not shown) in the housing. Both the electrical terminals 32, 34 and the shield terminal 64 extend into the circuit housing for electrical connection to the circuit board. The plastic casing 70 also forms a circumferential annular channel into which one end of the boot 80 is secured by an annular clamping device 82. An opposite end of the boot is likewise secured in an annular channel of the stop 42 by another annular clamping device 84. A variety of different types of clamping devices may be utilized, such as flexible plastic fasteners with interlocking ends or hose clamps.

Insertion of the shorted secondary winding 40b into the primary winding is limited by a face 42a of the stop 42. For maximum sensitivity, the shorted secondary winding 40b should have sufficient axial length to extend through the full axial length of the primary winding when fully inserted. Also, the radial spacing between the outer surface of the secondary winding 40b and the inner surfaces of the primary winding turns should be sufficiently small to ensure good electromagnetic coupling between the primary and secondary windings.

Figure 4:
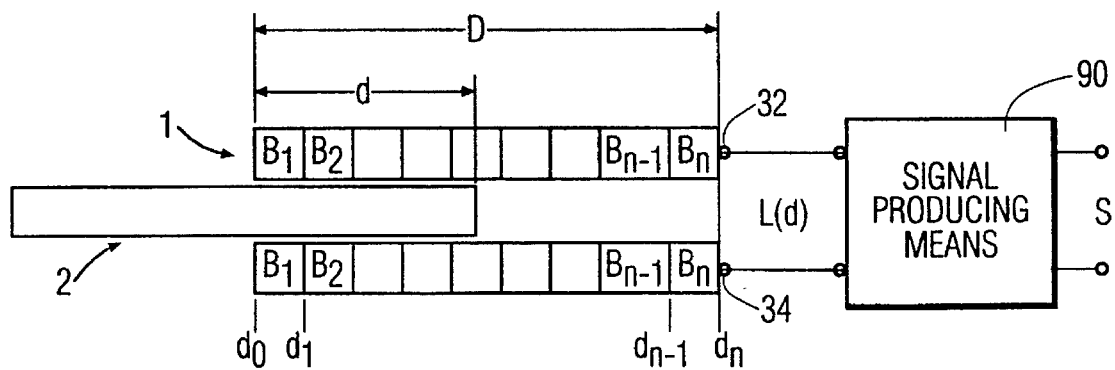
FIG. 4 is a schematic illustration of an embodiment of a position sensing apparatus in accordance with the invention.

FIG. 4 illustrates an embodiment of a position sensing apparatus in accordance with the invention. The apparatus includes a position sensing device generally of the above-described type, shown in simplified form as including the first and second parts 1 and 2, and a signal producing means 90. The terminals 32, 34 of the first part 1 are electrically connected to respective input terminals of the signal producing means. The signal producing means 90 produces an output signal S which varies with the inductance connected to its input in accordance with a predefined function f(L). By tailoring the turns distribution of the primary winding to effect the production of a variable inductance L(d) that complements the function f(L), the output signal S can be made to vary as a desired function of the position represented by the distance d shown in FIG. 4.

Figure 5:
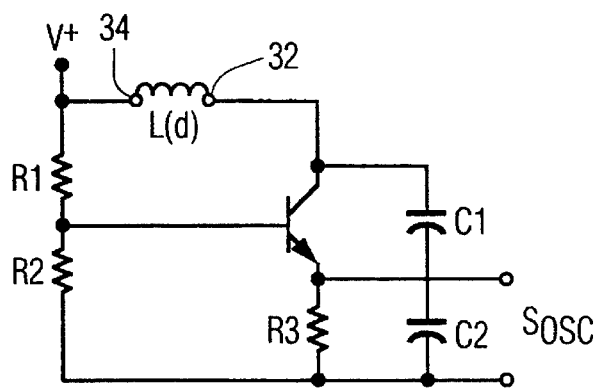
FIG. 5 is a schematic illustration of an embodiment of a signal producing means in the apparatus of FIG. 4.

An example of a simple, but very useful, signal producing means is the well-known Colpitts oscillator, of which one embodiment is shown schematically in FIG. 5. Note that the inductance in this circuit is the variable inductance L(d). This oscillator produces at its output a signal $S_{osc}$ having a frequency $f_{osc}$ which varies in accordance with the equation:

$$f_{osc}(d) = \frac{1}{2\pi \sqrt{L(d)C}} \quad \text{(Eqn. 1)}$$

$$\text{where: } C = \frac{C_1 C_2}{C_1 + C_2}$$

Solving for the inductance L(d), equation (1) transforms to:

$$L(d) = \frac{1}{4\pi^2 C f_{osc}^2(d)} \quad \text{(Eqn. 2)}$$

Figure 6:
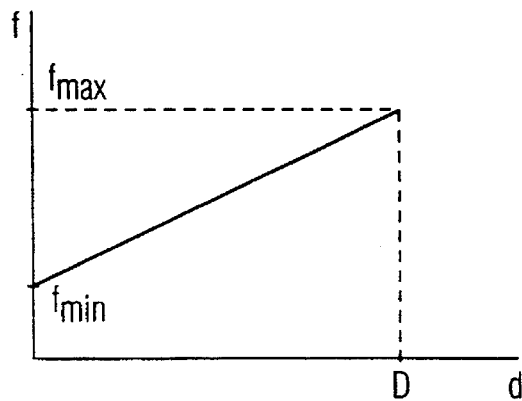
FIG. 6 is a graph illustrating a selected response curve for the apparatus of FIG. 4.

A particularly useful relationship between the frequency of the output signal $S_{osc}$ and, the position d is the linear relationship illustrated graphically fin FIG. 6 and expressed by the equation:

$$f_{osc}(d) = f_{min} + \frac{d}{D}(f_{max} - f_{min}) \quad \text{(Eqn. 3)}$$

where:
d=the insertion distance of the shorted secondary winding into the primary winding; D=the maximum insertion distance; $f_{min}$=the oscillator frequency at d=0; and $f_{max}$=the oscillator frequency at d=D.

In order to determine how the inductance of the position sensing device should vary with the position represented by the distance d, to achieve the desired linear relationship, one can substitute equation (3) into equation (2). This results in the equation:

$$L(d) = \frac{1}{4\pi^2 C \left[ f_{min} + \frac{d}{D}(f_{max} - f_{min}) \right]^2} \quad \text{(Eqn. 4)}$$

Naturally, any other type of monotonic response curve for the output frequency as a function of position d could be produced with the oscillator circuit shown in FIG. 5 by substituting an equation representing the desired response for equation (3). Alternatively, both a different signal producing means (such as a circuit which produces an output signal magnitude that varies with inductance) and a different type of response curve can be selected.

To produce a selected inductance variation as a function of the position, i.e. L(d), it is necessary to understand how the turns distribution of the primary winding relates to the device inductance. If the primary winding of the position sensing device illustrated generally in FIG. 4 is uniformly wound with a constant pitch and a constant number of layers of turns, with no spacings between the bays $B_1, B_2, \ldots B_n$, and if end effects are ignored, the inductance of the position sensing device is defined by the equation:

$$L(d) = \left(1 - \frac{d}{D}\right) L_0 + (1 - k^2) \frac{d}{D} L_0 \quad \text{(Eqn. 5)}$$

which reduces to:

$$L(d) = \left(1 - \frac{k^2 d}{D}\right) L_0 \quad \text{(Eqn. 6)}$$

where: $k^2 = 1 - \frac{L_D}{L_0}$ $L_0$ = device inductance for d = 0

$L_D$ = device inductance for d = D

The self inductance of any segment i of the primary winding is represented by the equation:

$$L_B(i) = \frac{L(d_{i-1}) - L(d_i)}{k^2} \quad \text{(Eqn. 7)}$$

where:
$L_B(i)$=the self inductance of the primary winding segment corresponding to bay i; $L(d_i)$=the device inductance for d=i $L(d_{i-1})$=the device inductance for d=i - 1 $k^2$=the mutual coupling coefficient between parts 1 and 2

The self inductance which any segment i of the primary winding must have to produce the device inductance expressed by equation 4 can be determined by substituting equation 4 into equation 7 for each of the terms $L(d_{i1})$ and $L(d_i)$. This results in the equation:

$$L_B(i) = \frac{1}{4\pi^2 C k^2} \left[ \frac{1}{\left[ f_{min} + \frac{d_{i-1}}{D}(f_{max} - f_{min}) \right]^2} - \frac{1}{\left[ f_{min} + \frac{d_i}{D}(f_{max} - f_{min}) \right]^2} \right] \quad \text{(Eqn. 8)}$$

The value of the mutual coupling coefficient $k^2$ can be simply determined by equating the derivatives of equations 4 and 6, each of which represents the rate of change of device inductance L(d) with respect to changes in the position d:

$$-\frac{k^2 L_0}{D} = -\frac{f_{max} - f_{min}}{2\pi^2 CD \left[ f_{min} + \frac{d}{D}(f_{max} - f_{min}) \right]^3} \quad \text{(Eqn. 9)}$$

Because the coefficient $k^2$ is a constant having the same value for any position d, Equation 9 can be simplified by solving for d=0, which results in:

$$k^2 = \frac{f_{max} - f_{min}}{2\pi^2 CL_0 f_{min}^3} \quad \text{(Eqn. 10)}$$

The number of turns required for each segment of the primary winding can be determined by using the general equation for the self inductance of a solenoid:

$$L_B(i) = \frac{N^2 \mu A (1 - k_s^2)}{\ell} \quad \text{(Eqn. 11)}$$

where:
L=axial length of coil
N=number of turns over length L
μ=magnetic permeability of the flux path
A=cross-sectional area of coil form
$k_s^2$=shield factor The shield factor $k_s^2$ for a position sensing device without any shield would be equal to zero. However, for a device with a shield:

$$k_s^2 = 1 - \frac{L(\text{with shield})}{L(\text{without shield})} \quad \text{(Eqn. 12)}$$

where:
L(with shield)=device inductance with shield present
L(without shield)=device inductance with shield removed By utilizing the above-derived equations, and compensating for end effects, it is possible to calculate the number of winding turns needed in each segment of a particular primary winding to produce a position sensing device having a desired inductance variation. End effects can be compensated for by concentrating the numbers of winding turns at the ends of the winding. In the above described embodiment, this could be done by increasing the numbers of turns in the end bays $B_1$ and $B_n$ above the numbers predicted in equation 11. Such an increase will correspondingly increase the flux produced in the ends of the primary winding and offset the local reduction of flux density caused by bending of the flux lines at the ends.

An embodiment of a position sensing device as illustrated in FIGS. 1–3 was made with a primary winding having 23 segments, each of length 2.39 mm in bays of corresponding lengths. The partitions 12, 12' separating the adjacent winding segments each had a thickness of 1.27 mm. The total axial length of the winding was L=84.2 mm and the inner diameter of each segment (determined by the outside diameter of part 1 on which the winding is wound) was 17.2 mm. Approximate values for both of the coefficients μ and $k_s^2$ can be obtained from standard data sources for the particular solenoid structure used. One such source is Reference Data for Radio Engineers, 5th Edition, Howard W. Sams & Co., Inc. (1973). For the device which was made, values of μ=1.257×10⁻⁹ Henry/mm and $k_s^2$=0.181 were used.

In the device, the turns distribution of the primary winding was selected for producing at the output of the oscillator depicted in FIG. 5 the frequency variation illustrated graphically in FIG. 6. This was done by choosing the frequencies $f_{max}$ (21 KHz) and $f_{min}$ (19 KHz), by determining the values of $L_0$ (30.1 mHenry) and C (2.33×10⁻⁹ Farad) which will cause the oscillator to produce the output frequency $f_{min}$ by determining the value of $K^2$ from equation 10, and by equating equation 11 to equation 8 for each of the positions $d_0$ to $d_n$ to determine the number of turns for each of the primary winding segments.

Figure 7:
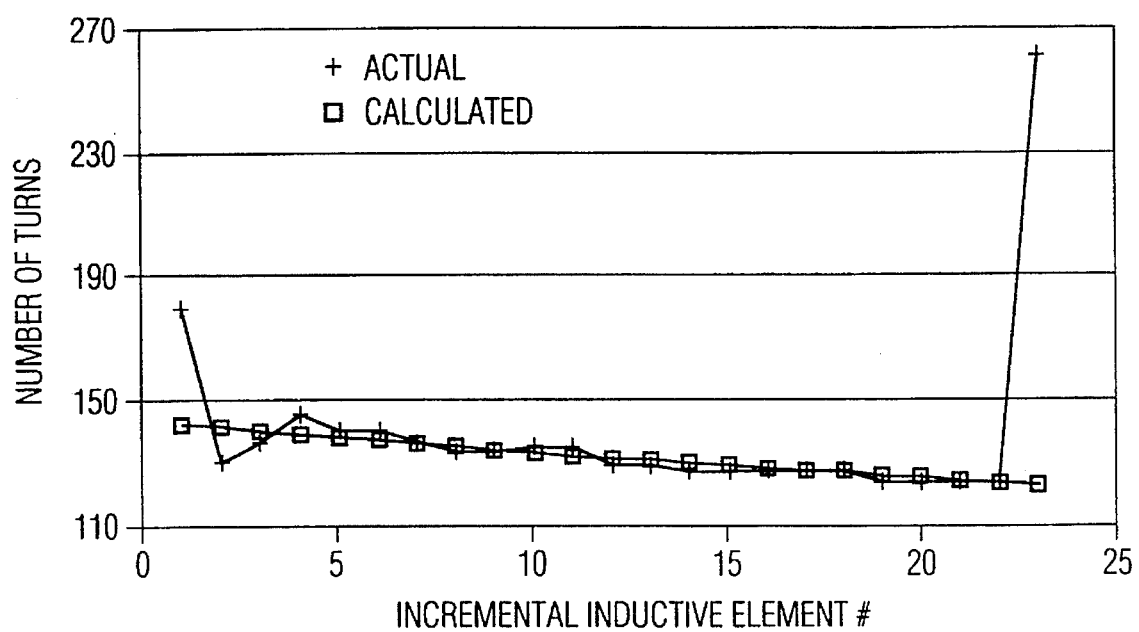
FIG. 7 is a graph illustrating the turns distribution of a winding in a position sensing device in accordance with the invention.

The calculated versus actual numbers of turns $L_b(i)$ for each of the 23 coil segments, to produce the output illustrated in FIG. 6, are plotted in FIG. 7. The numbers which were calculated by use of the above equations are indicated by boxes (□), while the actual numbers of turns needed to produce the desired linear output are indicated by crosses (+). Note that, except at the ends, the two curves agree closely. Because of the end effects, it was found necessary to substantially increase the numbers of turns in bays 1 (from 141 to 180) and 23 (from 122 to 262). The number of turns in bay 23 could actually have been significantly smaller. For example, an increase to a number approximately 1.25 times the calculated value of 122 turns would effect the desired linear output. However, the number was further increased, without delinearizing the output, to adjust the total self inductance of the primary winding to the desired value of $L_0$=30.1 mHenry.

In the above-described embodiment the inductance L(d) of the position sensing device must change at a fairly constant rate with position d (the first derivative of equation 4) in order to provide the desired output from the oscillator circuit of FIG. 5. In this case it was convenient to make each of the winding segments of equal length and to make each of the separating partitions of equal thickness. However, in cases where the rate of change of L(d) must vary significantly, it might be desirable to vary the segment lengths and/or the separating partition thicknesses accordingly. These and many other variations are possible within the scope of the invention.

We claim:

1. A variable inductance device for sensing the position of a first member relative to a second member, said device comprising:

a first rod-shaped body comprising an electrically insulating material, a predetermined length of said rod-shaped body being disposed around an axis and including structural retention means for supporting turns of a winding in an arbitrarily selectable, axial distribution and for restraining said turns against axial movement;

a primary winding comprising an electrical conductor wound along at least part of the predetermined length of said rod shaped body in engagement with the structural retention means in a selected axial turns distribution;

first mounting means for attaching the first rod-shaped body to the first member for moving with said first member;

a second rod-shaped body comprising an electrically conductive material forming a shorted secondary winding; and second mounting means for attaching the second rod-shaped body to the second member for moving with said second member;

at least one of said first and second rod-shaped bodies being hollow and being axially slidable over the other of said bodies.

2. A device as in claim 1 where the structural retention means comprises an integrally formed portion of the first rod-shaped body.

3. A device as in claim 1 or 2 where the structural retention means defines a plurality of axially adjacent, circumferentially extending compartments, selected numbers of turns of the primary winding being retained in respective ones of said compartments.

4. A device as in claim 3 where said compartments are axially spaced from each other by partitions of predetermined thicknesses.

5. A device as in claim 4 where each of said compartments has substantially the same axial length.

6. A device as in claim 4 where each of said partitions has substantially the same axial thickness.

7. A device as in claim 3 where the selected axial turns distribution is achieved by winding substantially identical numbers of primary winding turns in at least two of the compartments.

8. A device as in claim 3 where the axial turns distribution is selected to effect a predefined variation in inductance of the device with said position.

9. A device as in claim 8 where the respective numbers of primary winding turns in first and second compartments proximate opposite ends of the primary winding are substantially larger than the numbers of turns in adjacent ones of the compartments.

10. A device as in claim 1 or 2 where the second rod-shaped body is hollow.

11. A variable inductance device for sensing the position of a first member relative to a second member, said device comprising:

a first rod-shaped body comprising an electrically insulating material, a predetermined length of said rod-shaped body being disposed around an axis and including structural retention means for supporting turns of a winding in an arbitrarily selectable, axial distribution and for restraining said turns against axial movement;

a primary winding comprising an electrical conductor wound around said axis in engagement with the structural retention means, said winding having first and second ends where turns of the winding are concentrated and having an intermediate portion where the axial turns distribution is selected to effect a predefined variation in inductance of the device with said position;

terminal means electrically connected to the primary winding for enabling the application of an electrical signal to said primary winding;

first mounting means for attaching the first rod-shaped body to the first member for moving with said member;

a second rod-shaped body comprising an electrically conductive material forming a shorted secondary winding;

second mounting means for attaching the second rod-shaped body to the second member for moving with said member;

at least one of said first and second rod-shaped bodies being hollow and being axially slidable over the other of said bodies; and shielding means disposed for shielding at least the primary winding from external electromagnetic influences.

12. A device as in claim 11 where the structural retention means comprises an integrally formed portion of the first rod-shaped body.

13. A device as in claim 11 or 12 where the structural retention means defines a plurality of axially adjacent, circumferentially extending compartments, selected numbers of turns of the primary winding being retained in respective ones of said compartments.

14. A device as in claim 13 where said compartments are axially spaced from each other by partitions of predetermined thicknesses.

15. A device as in claim 14 where each of said compartments has substantially the same axial length.

16. A device as in claim 14 where each of said partitions has substantially the same axial thickness.

17. A device as in claim 13 where the selected axial turns distribution is achieved by winding substantially identical numbers of primary winding turns in at least two of the compartments.

18. A device as in claim 11 or 12 where the axial turns distribution is selected to effect a predefined variation in inductance of the device with said position.

19. A device as in claim 11 or 12 where the first rod-shaped body is hollow and is slidable over the second rod-shaped body.

20. A device as in claim 19 where the shielding means comprises a tubular body disposed around the primary winding.

21. A device as in claim 20 where the shielding means comprises an electrically conductive, magnetically permeable composition.

22. A device as in claim 21 where the shielding means comprises a body formed from cold-rolled steel and having a coating of an electrically conductive material.

23. A device as in claim 22 where the coating consists essentially of copper.

24. A device as in claim 22 where the coating is itself coated with a corrosion resistant material.

25. A device as in claim 24 where the corrosion resistant material consists essentially of tin.

26. A device as in claim 19 where the second rod-shaped body is hollow.

27. An apparatus for producing a signal which varies with the position d of a first member relative to a second member in accordance with a preselected function S(d), said apparatus comprising:

a. a signal producing means having an input for the connection of a variable inductance device and having an output for producing a signal which varies with the inductance L of said device in accordance with a predefined function f(L); and b. a variable inductance device for sensing the position of the first member relative to the second member, said device comprising:

a first rod-shaped body comprising an electrically insulating material, a predetermined length of said rod-shaped body being disposed around an axis and including structural retention means for supporting turns of a winding in an arbitrarily selectable, axial distribution and for restraining said turns against axial movement;

a primary winding electrically connected to the input of the signal producing means, said primary winding comprising an electrical conductor wound along the predetermined length in engagement with the structural retention means in an axial turns distribution which is selected to produce an inductance variation L(d) which, in combination with the function f(L) effects the production at the output of the signal production means of a signal which varies in accordance with said preselected function S(d);

first mounting means for attaching the first rod-shaped body to the first member for moving with said member;

a second rod-shaped body comprising an electrically conductive material forming a shorted secondary winding; and second mounting means for attaching the second rod-shaped body to the second member for moving with said member;

at least one of said first and second rod-shaped bodies being hollow and being axially slidable over the other of said bodies.

28. An apparatus as in claim 27 where the signal producing means comprises an LC oscillator for producing a signal having a frequency which varies as a function of the position d.

29. An apparatus as in claim 28 where said frequency varies substantially linearly with the position d.

30. An apparatus as in claim 27 where the variable inductance device includes shielding means disposed for shielding at least the primary winding from external electromagnetic influences.

* * * * *